United States Patent [11] 3,612,085

| [72] | Inventor | Ruel R. Clark |
| | | Salt Lake City, Utah |
| [21] | Appl. No. | 797,587 |
| [22] | Filed | Feb. 7, 1969 |
| [45] | Patented | Oct. 12, 1971 |
| [73] | Assignee | I-T-E Imperial Corporation |

[54] FLUID PRESSURE DETECTOR
12 Claims, 8 Drawing Figs.

| [52] | U.S. Cl. | 137/12, 137/81.5 |
| [51] | Int. Cl. | F15c 3/04, F15c 1/14 |
| [50] | Field of Search | 137/81.5, 82, 12; 251/331 |

[56] References Cited
UNITED STATES PATENTS

| 3,332,322 | 7/1967 | Beck | 251/331 X |
| 2,991,805 | 7/1961 | Page | 235/201 X |
| 3,057,376 | 10/1962 | Agutter et al. | 251/367 X |
| 3,094,144 | 6/1963 | Oxley et al. | 251/367 X |
| 3,318,329 | 5/1967 | Norwood | 235/201 ME |
| 3,407,833 | 10/1968 | Brandenberg | 235/20 ME |
| 3,424,063 | 1/1969 | Norwood | 251/331 X |
| 3,433,257 | 3/1969 | Jensen | 235/201 ME |
| 3,460,557 | 8/1969 | Gallant | 137/82 |

*Primary Examiner*—Samuel Scott
*Attorney*—Hofgren, Wegner, Allen, Stellman & McCord ABSTRACT: An apparatus, method, or system for comparing fluid pressure input signals and providing an output signal proportional to the difference in pressure between the input signals, employing a housing having a flexible diaphragm separating the housing into a reference chamber and a feedback chamber, there being provided an output port centrally disposed in the feedback chamber and adapted to be variably controlled by the diaphragm, with one of the fluid pressure signals being applied to the reference chamber and the other fluid pressure signal being applied to the other chamber, and a device for utilizing the signal in the outlet port representing the difference in pressure between the two input signals.

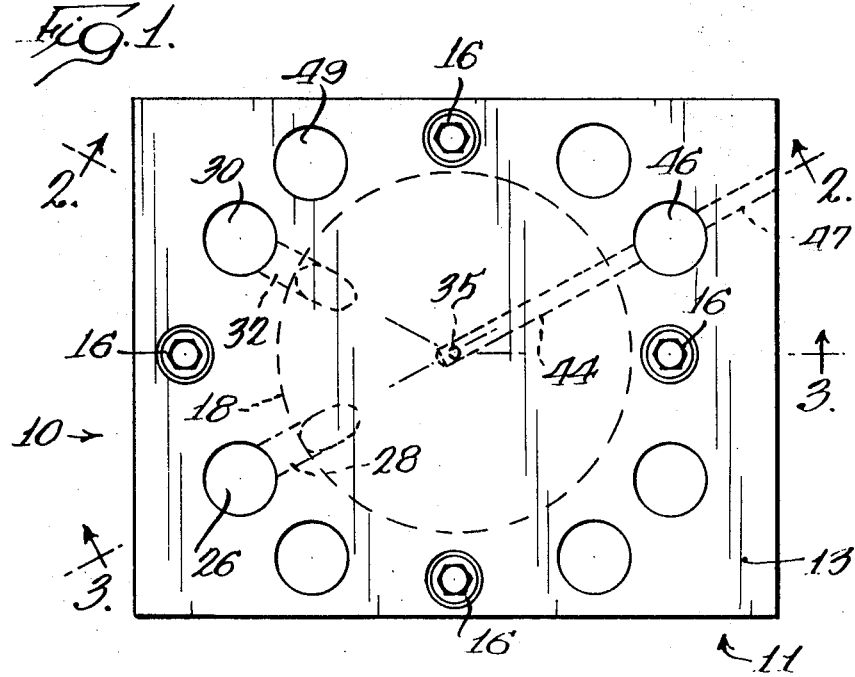
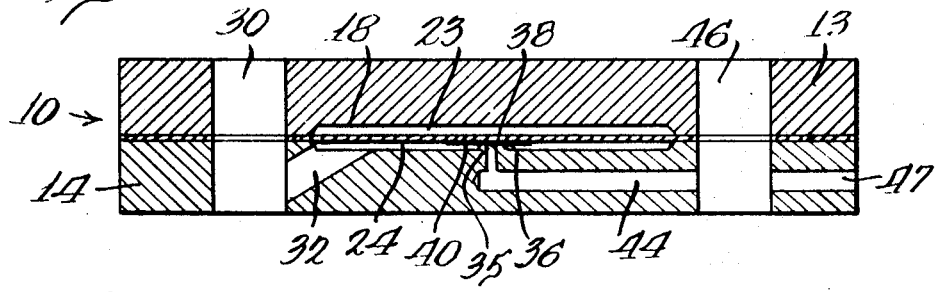
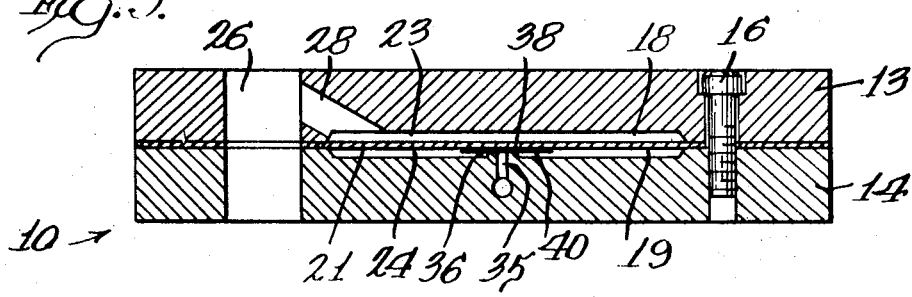

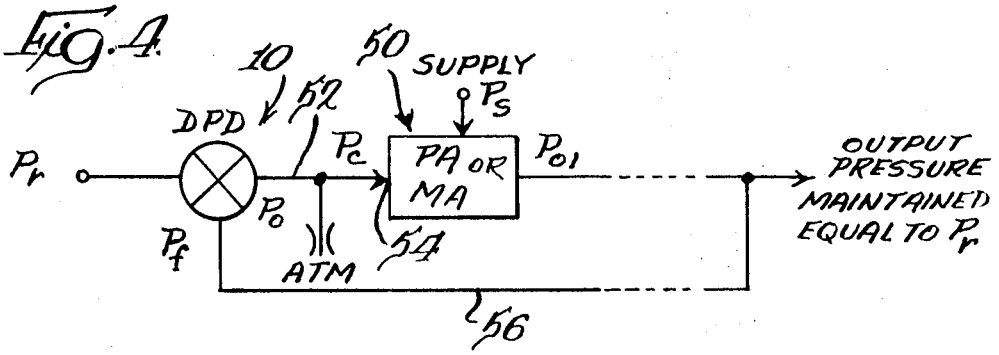
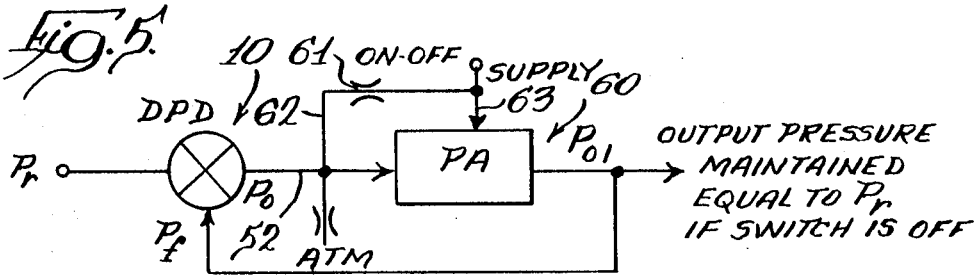
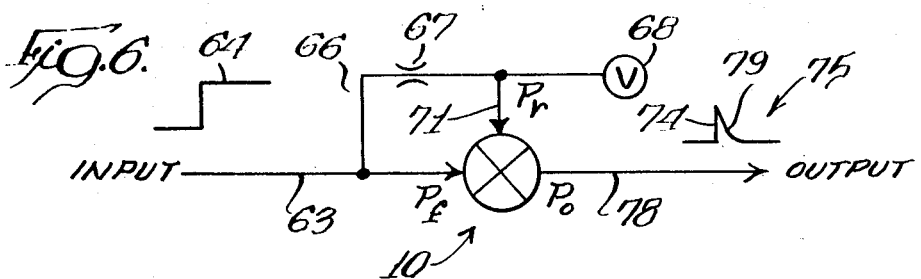
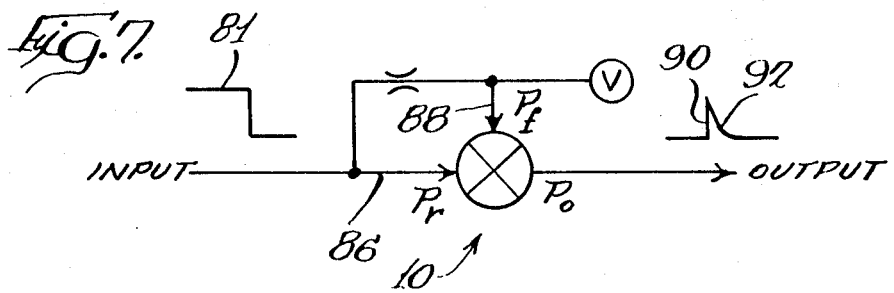

DPD PERFORMANCE CURVE DIFFERENTIAL PRESSURE $P_r - P_f$ (PSIG)

FLUID PRESSURE DETECTOR

BACKGROUND OF THE PRESENT INVENTION

The rapid development of the art of fluidics over the past decade has created a need for fluid operable components and subsystems that perform functions similar to electronic subcircuitry in electronic circuits. As is apparent to those skilled in the art of fluidics and fluid dynamics the term "fluidics" is generally applied to a technology including components without moving parts. One circuit function that it is desirable to form in fluid circuits, that has an electronic analogy, is the comparison of two fluid pressure signals and the provision of an output signal proportional to the difference between the two input signals. Such a function is useful in various types of feedback circuits, differentiators and many other circuits that require the comparison of two fluid pressure signals.

While the present fluid pressure comparing device, or differential pressure detector, is useful with fluidic components in making up a fluid circuit of various types, it is not by itself a pure fluid device since it does employ moving parts. It has been found during the development of the fluidic technology that it is desirable to combine fluidic components with nonfluidic components because in many cases the nonfluidic elements are simpler, require less accurate machining and have certain other advantages.

The present invention is directed to a diaphragm operated differential pressure detector which has utility in many fluid circuits for differential pressure detection as required. While this function may be performed by pure fluid devices, the machining accuracies required, the instability of the latter devices at very low differential pressure, and their cost make them undesirable in many circuit applications.

Moreover, it is known in the fluid valve art to provide various types of diaphragm operated valves. These prior valves have been either complex in construction or provide merely an "on-off" output, i.e. they are digital devices rather than proportional devices.

SUMMARY OF THE PRESENT INVENTION

In accordance with the present invention a differential pressure detecting system is provided that accurately measures the difference in pressure between two fluid input signals and provides an output signal having a pressure proportional to the difference in pressure between the two input signals. This system includes a component having a housing with a diaphragm in the housing having two chambers therein and adapted to variably open and close an outlet port extending into one of the chambers. With a reference signal applied to the other chamber, the component will provide no output signal when another signal of lesser pressure is applied to the chamber in which the outlet port is located, usually referred to herein as the feedback chamber although the present invention is not necessarily limited to circuit applications employing feedback. As the pressure of the control signal (the signal applied to the chamber including the outlet port) approaches and begins exceeding the reference signal pressure, the diaphragm will move away from the outlet port providing an output signal therein. As the diaphragm opens the pressure in the feedback chamber will fall somewhat and the diaphragm will move slightly closer to the outlet port providing a negative feedback function that increases the stability and proportionality of the differential pressure detecting component. As the control signal pressure increases further above the fluid pressure in the reference chamber the output signal pressure will increase even further, proportional to the difference between the reference and control signal pressures. By accurately regulating the control signal pressure any output signal pressure may be achieved from zero p.s.i. to the value of the control signal pressure. Moreover, by the proper selection of reference signal pressure and pressure differential the present device can operate over an extremely wide range of output signals.

Further, according to the present invention the output signal may be utilized by a fluid component that responds to the magnitude of the difference between these input signals. In cases where a portion of the output from this latter fluid component is employed as a feedback signal providing the above described control signal, it is desirable that the fluid component be a negative gain amplifier so that increasing pressure output signals from the differential pressure detecting component will provide reduced outputs from the fluid component controlled thereby.

Moreover, as will appear herein in more detail the present differential pressure component has particular utility in other subcircuits such as fluid signal differentiating circuits.

BRIEF DESCRIPTION OF THE DRAWINGS

FIG. 1 is a top elevation of the present pressure detecting component;

FIG. 2 is a cross section taken generally along line 2—2 of FIG. 1;

FIG. 3 is a cross section taken generally along line 3—3 of FIG. 1;

FIG. 4 is a schematic diagram of a constant pressure control circuit utilizing the differential pressure detecting component of FIGS. 1 to 3;

FIG. 5 is a schematic diagram similar to FIG. 4 with on-off control;

FIG. 6 is a fluid signal differentiating circuit for positive going input signals;

FIG. 7 is a fluid signal differentiating circuit for negative going input signals.

DETAILED DESCRIPTIONS OF THE PREFERRED EMBODIMENTS

Figure 8:
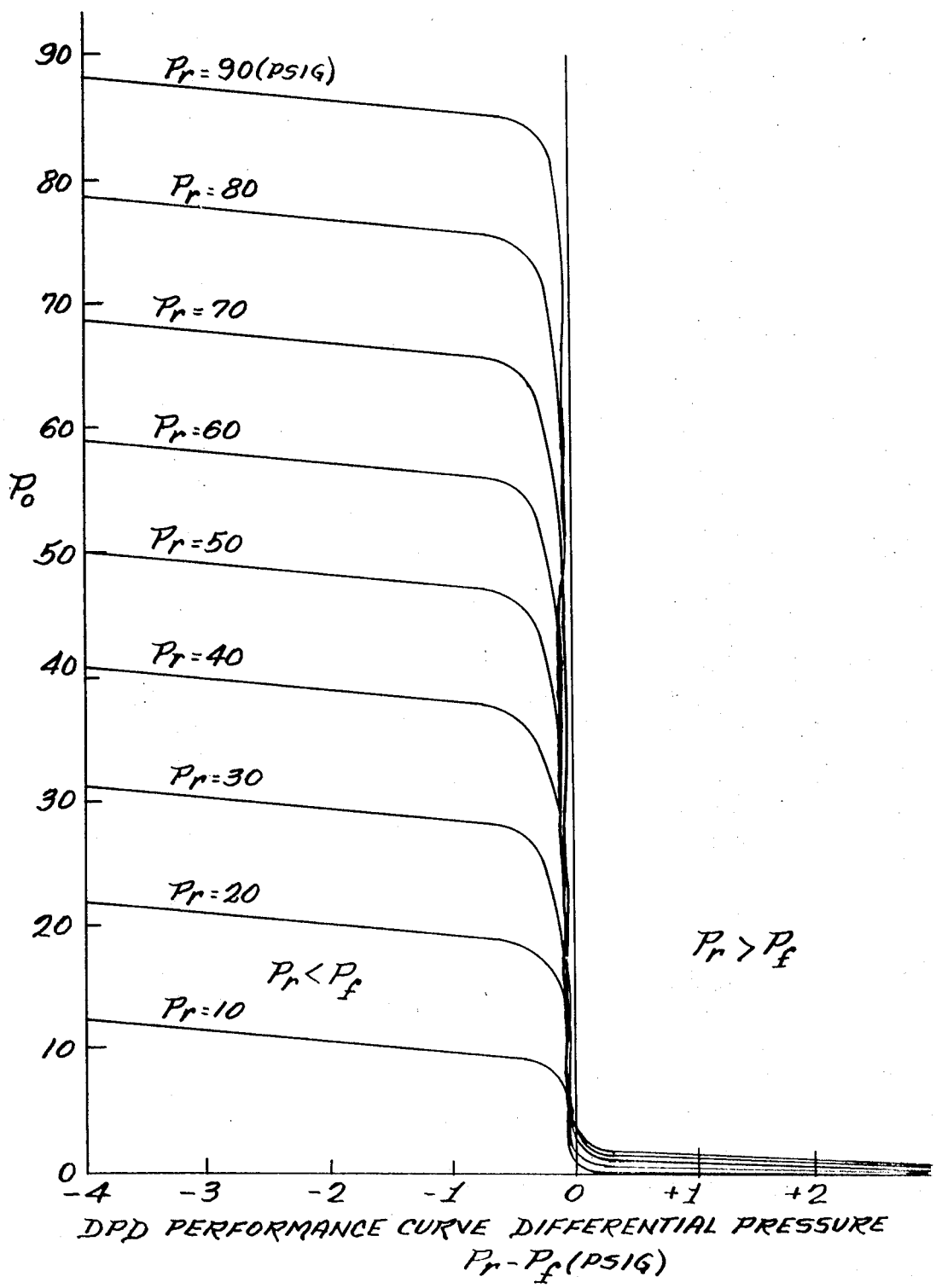
FIG. 8 is a graph showing the output signal characteristics of a device constructed according to the present invention with variations in differential input pressure.

Referring to FIGS. 1 to 3 a differential pressure detecting component 10 is shown which is utilized in the circuits shown in FIGS. 4 to 7 to provide an output signal proportional to the difference in pressure between two input signals when one of the input signals exceeds the pressure of what is termed herein a reference input signal.

The detecting component 10 is seen to include a housing 11 having a rectangular plate upper housing member 13 and complimentary rectangular plate lower housing member 14 rigidly fastened together by a plurality of threaded fasteners 16. Centrally formed in each of the housing members 13 and 14 are shallow circular recesses 18 and 19. The housing members 13 and 14 may be constructed of aluminum.

Sandwiched between the housing members 13 and 14 and extending completely across the recesses 18 and 19 is a flexible diaphragm 21, constructed of a suitable material such as acetate. The diaphragm 21 divides the chamber formed by the recesses 18 and 19 into a reference chamber 23 and a feedback chamber 24.

For the purpose of providing a reference input signal to chamber 23 and axially extending opening 26 is provided in the housing members 13 and 14, extending completely therethourgh. Opening or port 26 extends completely through the component 10, as do the other ports as will appear hereinbelow, so that the component 10 may be stacked and clamped together with other fluidic elements eliminating the need for tubing and fittings between the components. Such an assembly of components is more fully described in the copending application of E. J. Purcell et al., Ser. No. 601,919, filed Dec. 15, 1966, now Pat. No. 3,548,849, issued Dec. 22, 1970 entitled "Fluid Circuit Package," assigned to the assignee of the present invention.

Port 26 communicates with reference chamber 23 through an angularly disposed passage 28 in housing member 13.

For the purpose of providing a control or feedback signal to the control chamber 24 an opening 30 is provided extending completely through both housing members 13 and 14 in a similar fashion to port 26. Opening of port 30 communicates with chamber 24 through an angular passage 32 in housing member 14.

An outlet port 35 is provided in the housing member 14 centrally of chamber 24. Port 35 is defined in part by a projection 36 extending upwardly into chamber 24 and having a flat upper surface 38.

The port 35 is normally sealed by the engagement of a thin piece of rubber 40 therewith, fixed to and carried by the diaphragm 21. The diaphragm 21, the rubber member 40 and the projection 36 are sized so that without the application of pressure, other than atmospheric, to the chambers 23 and 24 the bottom of rubber member 40 just engages the sealing surface 38 without significantly deforming the diaphragm 21. The outlet port 35 communicates with the exterior of the component 10 through a radially extending passage 44 in housing 14 communicating with an axial bore 46 extending completely through the housing members 13 and 14. Passage 44 also communicates with the periphery of the housing through passage 47 which communicates with opening or bore 46.

Other bores, such as openings 49 may be provided through the housing members 13 and 14 for the purpose of providing openings for clamping the component 10 to other components or for the purpose of conveying fluid through the component 10 but isolated therefrom.

For a description of the operation of the present device reference will be made to FIGS. 1 to 3 as well as to FIG. 8 which is a graph illustrating the variation in output pressure with differential input pressures. In FIG. 8 $P_r$ refers to the pressure in reference chamber 23, $P_f$ refers to the pressure in the control or feedback chamber 24, $P_o$ is the pressure in outlet port 35, $P_r-P_f$ is the pressure differential between the pressure in chambers 23 and 24. The portion of the curves to the right of zero differential pressure $P_r-P_f$ represents the condition of the device when $P_r$ exceeds $P_f$ or when the pressure in reference chamber 23 exceeds the pressure in feedback chamber 24. Under these conditions it can readily be seen that substantially zero output pressure occurs under this condition regardless of the value of the reference pressure. The characteristics of the device to the left of zero pressure differential in FIG. 8 indicate operation in a range where $P_f$ exceeds $P_r$ or more specifically when the pressure in chamber 24 exceeds the pressure in chamber 23. Under these conditions and particularly at low negative differential pressures it can be seen that there is a fairly rapid rise in the outlet pressure.

The present differential pressure detector has the following mathematical characteristics.

$$P_o = \begin{cases} Q; \text{ when } P_r > P_f \\ K(P_r - P_f); \text{ when } P_r < P_f \\ P_f; \text{ when } P_r \text{ significantly less than } P_f \end{cases}$$

Assuming that the fluid pressure signal $P_r$ of 35 p.s.i.g. is applied to port 26 in reference chamber 23 and that a fluid pressure signal $P_f$ of 34 p.s.i.g. is applied to port 30 and control chamber 24. In this condition, $P_o$ is zero or nearly so. $P_f$ may be then slowly increased. As $P_f$ approaches $P_r$, or 35 p.s.i.g., the diaphragm 21 and rubber member 40 begin to move away from the outlet port 35 and surface 38 and flow starts through the outlet port. The phenomenon which occurs at this point gives the present device a high degree of stability. As the flow begins through port 35 from chamber 24, the pressure in chamber 24 decreases slightly and tends to reduce the flow through the outlet port 35. This is basically a stabilizing, negative feedback effect and yields the highly sloped portions of the performance curves shown in FIG. 8. It should be emphasized that the present differential pressure detector is a proportional device and not a digital one. Any value of $P_o$ may be obtained (less than $P_f$ the control pressure) by precisely adjusting the differential pressure $P_r-P_f$.

An exemplary construction of the differential pressure detecting component 10 that performs satisfactorily in accordance with the objects of the present invention has the following basic parameters; diaphragm diameter—1.25; passages 28 and 32—0.125; outlet port 35—0.040; thickness of housing members 13 and 14, each—0.125; thickness of acetate diaphragm 21—0.010; thickness of rubber plate 40—0.003.

It should be noted that one of the purposes of the rubber plate 40 attached to the diaphragm is to provide a better seal for the outlet port 35 in the region of slightly positive differential pressures, i.e. $P_r > P_f$ by better mating between the hard surface of the plate and the outlet port exit 35 and surface 38.

As seen in FIG. 4 the differential pressure detecting component 10 is utilized in a circuit according to the present invention which provides a controlled constant pressure, the one that follows the input pressure $P_r$. The differential pressure detector 10 is arranged to provide a control signal $P_c$ to a negative gain fluid amplifier 50. It should be understood that the present differential pressure detector 10 is not a high gain device since its output signal $P_o$ derives its pressure from the control signal $P_f$. Its chief characteristic is its remarkable sensitivity and not gain.

The fluid device 50 may be a negative gain fluid amplifier of conventional construction and reference is made hereto to the copending application of O. Lew Wood, Ser. No. 606,238, filed Dec. 30, 1966, now Pat. No. 3,500,846, issued Mar. 17, 1970 entitled "Fluid Device," assigned to the assignee of the present invention. The device 50 is constructed so that once supplied with a continuous flow of fluid $P_s$ it will provide a proportionally decreasing output signal $P_o^1$ as the control signal $P_c$ increases. The amplification of device 50 is desirable since the differential pressure detector 10 does not essentially have amplification characteristics. Line 52 connects the output port of the differential pressure detector 10 to control port 54 of the fluidic device 50. A feedback signal is derived from the outlet signal $P_o^1$ of device 50 through line 56. Line 56 conveys a fluid pressure feedback signal to the control or feedback chamber of the differential pressure detector 10. So long as $P_f$, or the feedback signal in line 56, is less than the reference signal $P_r$, no pressure signal will be provided in line 52 and the fluidic device 50 will provide its maximum output signal $P_o^1$. Assuming that the actual output signal $P_o^1$ is more than the desired output, i.e. $P_r$ is less than the desired $P_o^1$, the feedback in line 56 will proportionally lift the diaphragm in the differential pressure detector 10 and provide a signal in line 52 proportionally to the difference between $P_r$ and $P_f$ and variable control the fluidic device 50 to increase output pressure $P_o^1$ to a value equal to $P_r$ and will maintain that relationship so long as $P_r$ is less than the maximum $P_o^1$ possible from a fluidic device 50.

Referring to FIG. 5 where a similar circuit to FIG. 4 is illustrated, in some cases it may be desirable to control the output from fluidic device 60, similar to fluidic device 50, at two pressure levels. Toward this end an on-off switch 61 is provided in a line 62 interconnecting line 52 and supply line 63. When the switch is off the output pressure $P_o^1$ will be maintained at a pressure equal to $P_r$, and the amplifier 60 will provide its maximum output $P_o^1$. In this manner the circuit may be used, for example, to provide a rapid approach and a slow feed for a ram associated with a machine tool or the like.

As may be seen in FIG. 6 the present differential pressure detecting device may be utilized in a differentiating circuit for a positive going input wave generally designated schematically at 64. Reference numeral 64 represents a positive going fluid pressure profile in input line 63 which is connected to the control or feedback chamber of the fluidic device 10. The input signal is also applied through line 66 and across resistor 67 to a fixed volume fluid capacitor 68. The resistor 67 and the capacitor 68 modifies the input signal and derives therefrom a signal $P_r$ in line 71 to the reference chamber in the pressure detector 10. The positive going input signal in the reference chamber provides the rapidly rising portion 74 of the output waveform 75. The delayed and modified signal $P_r$ thereafter closes the diaphragm in component 10 decreasing the pressure in outlet line 78 and providing the decreasing sloping portion 79 of the output waveform 75.

By reversing the chamber connections the device 10 may be used as a differentiator for negative going fluid pressure signals as may be seen in FIG. 7. The negative going signal is represented at 81 with the difference in these circuits being that input line 86 is connected to the reference chamber of device 10, rather than the control chamber while line 88 is connected to the control or feedback chamber. The drop in pressure in the reference chamber caused by the rapid decrease in the input signal provides opening of the outlet port of device 10 and provides the rapidly increasing portion 90 of the output waveform. The modified and delayed signal in line 88 to the control chamber will thereafter fall causing diaphragm closure and the sloping and decreasing portion 92 of the output waveform completing the differentiated wave.

I claim:

1. A method of using a diaphragm operated valve as a differential pressure detector, the valve consisting of a housing having a diaphragm separating the housing into a first reference chamber and a second control chamber, the control chamber having an outlet port variably closed by the diaphragm, including the steps of supplying a reference fluid signal continuously to said reference chamber, supplying a variable control fluid signal to said control chamber to position the diaphragm so as to provide an output pressure signal in the outlet port proportional to the difference in pressure in the reference and variable fluid pressure signals, and utilizing the output pressure signal to control a device that responds to the magnitude of the differential pressure between the reference and variable fluid pressure signals.

2. A fluid signal comparator, comprising: housing means, diaphragm means in said housing means dividing said housing means into a reference chamber on one side of said diaphragm and a variable signal chamber on the other side of said diaphragm, outlet port means in said variable signal chamber, said diaphragm means having outlet port control means therein for variably controlling the extent of opening of said outlet port means, means for supplying a reference signal to said reference chamber, and means for supplying a variable signal to said variable signal chamber, said outlet port means and said diaphragm means being constructed so that the fluid signal in said outlet port means is proportional to the difference between the reference signal and the variable signal, said outlet port being positioned to be closed when pressure in said reference chamber is substantially equal to the pressure in said variable signal chamber, said outlet port means including a projection extending centrally within said variable chamber, said diaphragm means being unbiased except for fluid pressure in said chambers.

3. A system responsive to a differential pressure, comprising: means providing a reference fluid signal, fluid valve means responsive to a control fluid pressure signal for variably regulating the fluid pressure output of said valve means, a differential fluid pressure comparator for providing said control signal including housing means, flexible diaphragm means in said housing means separating said housing means into a reference chamber and a control chamber, a control signal outlet port in said control chamber, said diaphragm being adapted to control the opening of said outlet port, a variable fluid signal receiving port in said control chamber, means connecting said reference signal to said reference chamber, means connecting said control signal outlet port to supply said control signal to said valve means, and means for supplying a variable signal to said variable signal port whereby the control signal of the outlet port is proportional to the difference in pressure of the reference signal and the supply signal and the valve means responds to this pressure difference, said diaphragm closing said outlet port when the pressure in the reference chamber is substantially equal to the pressure in said control chamber, said outlet port means including a projection extending centrally within said control chamber, said diaphragm means being unbiased except for fluid pressure in said chambers.

4. A fluid signal comparator comprising: housing means, diaphragm means in said housing means dividing said housing means into a reference chamber on one side of said diaphragm and a variable signal chamber on the other side of said diaphragm, outlet port means in said variable signal chamber, said diaphragm means having outlet port control means therein for variably controlling the extent of opening of said outlet port means, means for supplying a reference signal to said reference chamber, and means for supplying a variable signal to said variable signal chamber, said outlet port means and said diaphragm means being constructed so that the fluid signal in said outlet port means is proportional to the difference between the reference signal and the variable signal, said outlet port being positioned to be closed when pressure in said reference chamber is substantially equal to the pressure in said variable signal chamber, said outlet port means including a projection on said housing extending into said variable signal chamber, a bore in said projection defining an outlet port, and a sealing plate carried by said diaphragm and positioned to selectively close said outlet port by engagement with said projection.

5. A fluid signal comparator as defined in claim 4 wherein said outlet port extends axially with respect to said chambers, said chambers being generally cylindrical in configuration, said outlet port means having a radially extending passage in said housing means communicating at one end with said outlet port and opening at the other end to the periphery of said housing means.

6. A fluid signal comparator as defined in claim 4 wherein said projection is disposed centrally in said variable signal chamber.

7. A system responsive to a differential pressure, comprising: means providing a reference fluid signal, fluid valve means responsive to a control fluid pressure signal for variably regulating the fluid pressure output of said valve means, a differential fluid pressure comparator for providing said control signal including housing means, flexible diaphragm means in said housing means separating said housing means into a reference chamber and a control chamber, a control signal outlet port in said control chamber, said diaphragm being adapted to control the opening of said outlet port, a variable fluid signal receiving port in said control chamber, means connecting said reference signal to said reference chamber, means connecting said control signal outlet port to supply said control signal to said valve means, and means for supplying a variable signal to said variable signal port whereby the control signal is proportional to the difference in pressure of the reference signal and the supply signal and the valve means responds to this pressure difference, feedback means from said fluid pressure output of said valve means providing a fluid pressure feedback signal, and means connecting said fluid pressure feedback signal to said control chamber of the differential pressure detector.

8. A system responsive to a differential pressure as defined in claim 7, wherein said fluid valve means has a negative gain characteristic.

9. A differentiator for a positive going fluid signal, comprising: means for supplying a fluid input signal that increases from a first pressure level to a second pressure level, a differential pressure detector including housing means, diaphragm means separating said housing means into a reference chamber and a control chamber, an outlet port in said control chamber variably controlled by said diaphragm means, a control port in said control chamber adapted to receive fluid and position the diaphragm means against the force of the pressure in said reference chamber, means connecting said fluid input signal to said control chamber, and means for supplying a continuous constant signal to said reference chamber delayed a predetermined time with respect to the rise in the input signal to reduce the outlet port signal to its original valve whereby the pressure waveform of the fluid in the outlet port will be a differentiated signal of the input signal pressure.

10. A differentiator as defined in claim 9, wherein said means for supplying a signal to said reference chamber includes passage means communicating with said means for supplying the input signal, fluid resistor and fluid capacitor means in said passage means.

11. A differentiator for a negative going input signal, comprising: means for supplying a fluid input signal that decreases from a first pressure level to a second lower pressure level, a differential pressure detector including housing means, diaphragm means separating said housing means into a reference chamber and a control chamber, an outlet port in said control chamber variably controlled by said diaphragm means, a control port in said control chamber adapted to receive fluid and position the diaphragm means against the force of the pressure in said reference chamber, means connecting the fluid input signal to said reference chamber, and means for supplying a continuous constant fluid signal to said control chamber control port delayed a predetermined time with respect to the fall in the input signal to reduce the outlet port signal to its original valve whereby the pressure waveform of the fluid in the outlet port is a differentiated form of the input signal pressure.

12. A differentiator as defined in claim 11, wherein said means for supplying fluid to said control port includes passage means communicating with said input signal supply means, fluid resistor and fluid capacitor means in said passage means.